US012060859B2

(12) United States Patent
Sharp et al.

(10) Patent No.: US 12,060,859 B2
(45) Date of Patent: Aug. 13, 2024

(54) GENERATOR ENCLOSURE AIR INTAKE WITH DAMPER

(71) Applicant: STEWART & STEVENSON LLC, Houston, TX (US)

(72) Inventors: Brian Sharp, Houston, TX (US); Jason Robison, Houston, TX (US); Chris Harvell, Houston, TX (US)

(73) Assignee: STEWART & STEVENSON LLC, Houston, TX (US)

( * ) Notice: Subject to any disclaimer, the term of this patent is extended or adjusted under 35 U.S.C. 154(b) by 0 days.

(21) Appl. No.: 18/123,403

(22) Filed: Mar. 20, 2023

(65) Prior Publication Data

US 2023/0296068 A1 Sep. 21, 2023

Related U.S. Application Data

(60) Provisional application No. 63/322,064, filed on Mar. 21, 2022.

(51) Int. Cl.

*F02M 35/02* (2006.01)
*F02M 35/024* (2006.01)
*F02M 35/10* (2006.01)

(52) U.S. Cl.

CPC .. *F02M 35/10288* (2013.01); *F02M 35/0212* (2013.01); *F02M 35/024* (2013.01); *F02M 35/10013* (2013.01); *F02M 35/10295* (2013.01); *F02M 35/10301* (2013.01); *F02M 35/1038* (2013.01)

(58) Field of Classification Search

CPC ....... F02M 35/10006; F02M 35/10288; F02M 35/10013; F02M 35/10295; F02M 35/10301; F02M 35/1038; F02M 35/024; F02B 63/044; F01P 1/00; F01P 7/02; F01P 11/12; F01P 2001/005; F01P 2060/12

See application file for complete search history.

(56) References Cited

U.S. PATENT DOCUMENTS

| | | | | |
|---|---|---|---|---|
| 10,894,295 | B2 * | 1/2021 | Taylor | B23K 9/1006 |
| 2012/0014807 | A1 * | 1/2012 | Liang | F04D 29/703<br>416/247 R |
| 2014/0246863 | A1 * | 9/2014 | Vallinayagam | F01P 7/12<br>290/1 B |
| 2021/0298195 | A1 * | 9/2021 | Barbour | G06F 1/181 |
| 2022/0042444 | A1 * | 2/2022 | Jochman | F01P 7/04 |
| 2022/0140704 | A1 * | 5/2022 | Klos | F02B 63/044<br>290/1 A |
| 2023/0162716 | A1 * | 5/2023 | Maeta | F02B 63/044<br>181/224 |

FOREIGN PATENT DOCUMENTS

WO WO-2018162911 A1 * 9/2018

* cited by examiner

*Primary Examiner* — Grant Moubry
(74) *Attorney, Agent, or Firm* — Ewing & Jones, PLLC

(57) ABSTRACT

A system includes a generator and an enclosure surrounding the generator, the generator having an air intake and an inside surface. The system also includes an air intake housing affixed to the inside surface of the enclosure and fluidly connected to the air intake, the air intake housing terminating in an air intake housing inner plate positioned at inner edge of the air intake housing. The air intake housing inner plate has a plurality of air intake holes. In addition, the system includes a damper, the damper abutting the air intake housing inner plate, the damper having a plurality of damper holes. The damper is adapted to slide along the air intake housing inner plate.

20 Claims, 10 Drawing Sheets

GENERATOR ENCLOSURE AIR INTAKE WITH DAMPER

CROSS-REFERENCE TO RELATED APPLICATIONS

This application is a nonprovisional application which claims priority from U.S. provisional application No. 63/322,064, filed Mar. 21, 2022, which is incorporated by reference herein in its entirety.

TECHNICAL FIELD/FIELD OF THE DISCLOSURE

The present disclosure relates generally to a generator and specifically to an air intake system for a generator.

BACKGROUND OF THE DISCLOSURE

Generators typically include an air intake system for combustion air. It may be desirable to control the temperature of the combustion air for desired combustion efficiency. Operation of the generator with less than desired efficiency may result in lower power output or increased emissions of unburned and partially burned hydrocarbons.

SUMMARY

A system is disclosed. The system includes a generator and an enclosure surrounding the generator, the generator having an air intake and an inside surface. The system also includes an air intake housing affixed to the inside surface of the enclosure and fluidly connected to the air intake, the air intake housing terminating in an air intake housing inner plate positioned at inner edge of the air intake housing. The air intake housing inner plate has a plurality of air intake holes. In addition, the system includes a damper, the damper abutting the air intake housing inner plate, the damper having a plurality of damper holes. The damper is adapted to slide along the air intake housing inner plate.

A method is disclosed. The method includes supplying an air intake control system and electrically connecting an exterior temperature sensor to the air intake control system, the exterior temperature sensor positioned outside an enclosure. A generator is positioned within the enclosure. The method also includes electrically connecting an interior temperature sensor to the air intake control system, the interior temperature sensor positioned within the enclosure. In addition, the method includes electrically connecting a mechanical electric actuator to the air intake control system. Further the method includes mechanically connecting the mechanical electric actuator to a damper, the damper having damper holes. The damper abuts an air intake housing inner plate, the air intake housing inner plate having air intake holes.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
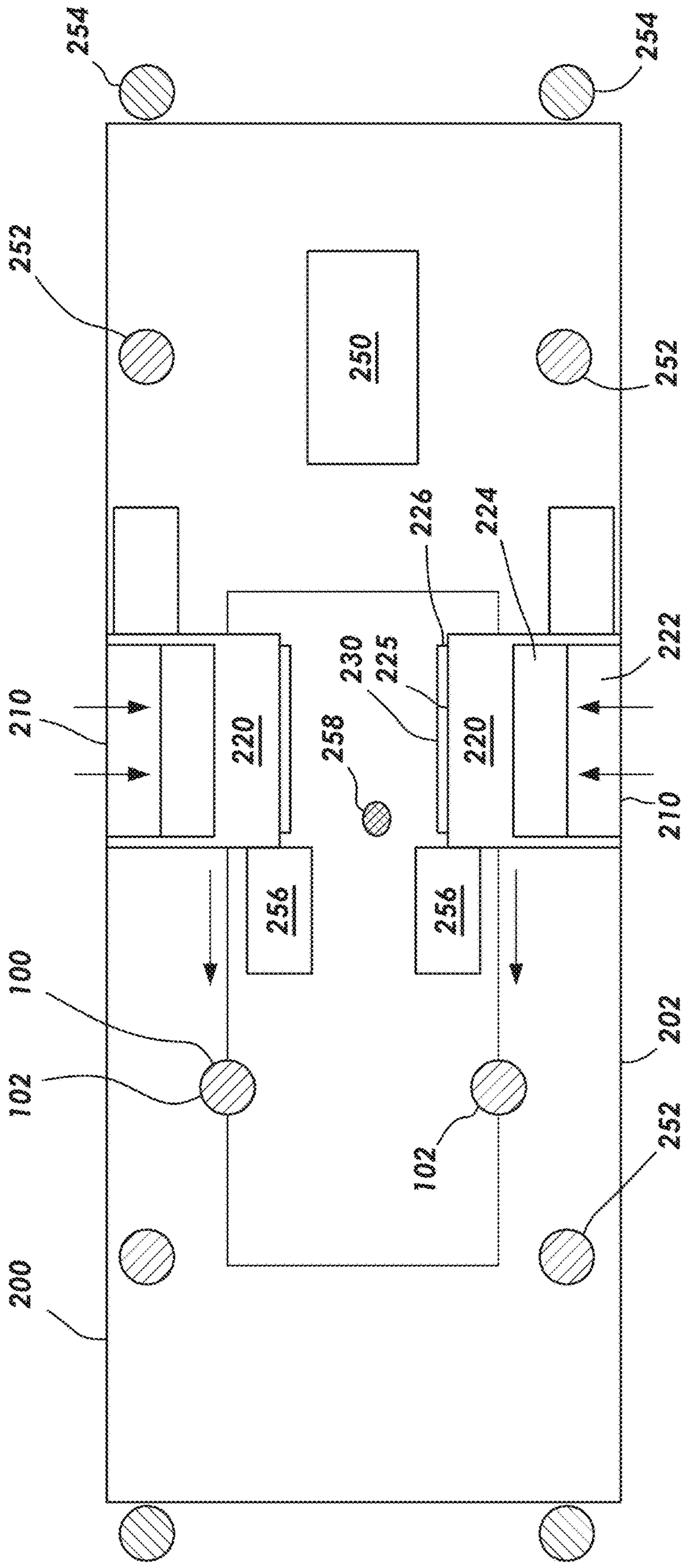
FIG. 1A is a block diagram of a generator within an enclosure with a damper in the closed position, consistent with certain embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1B:
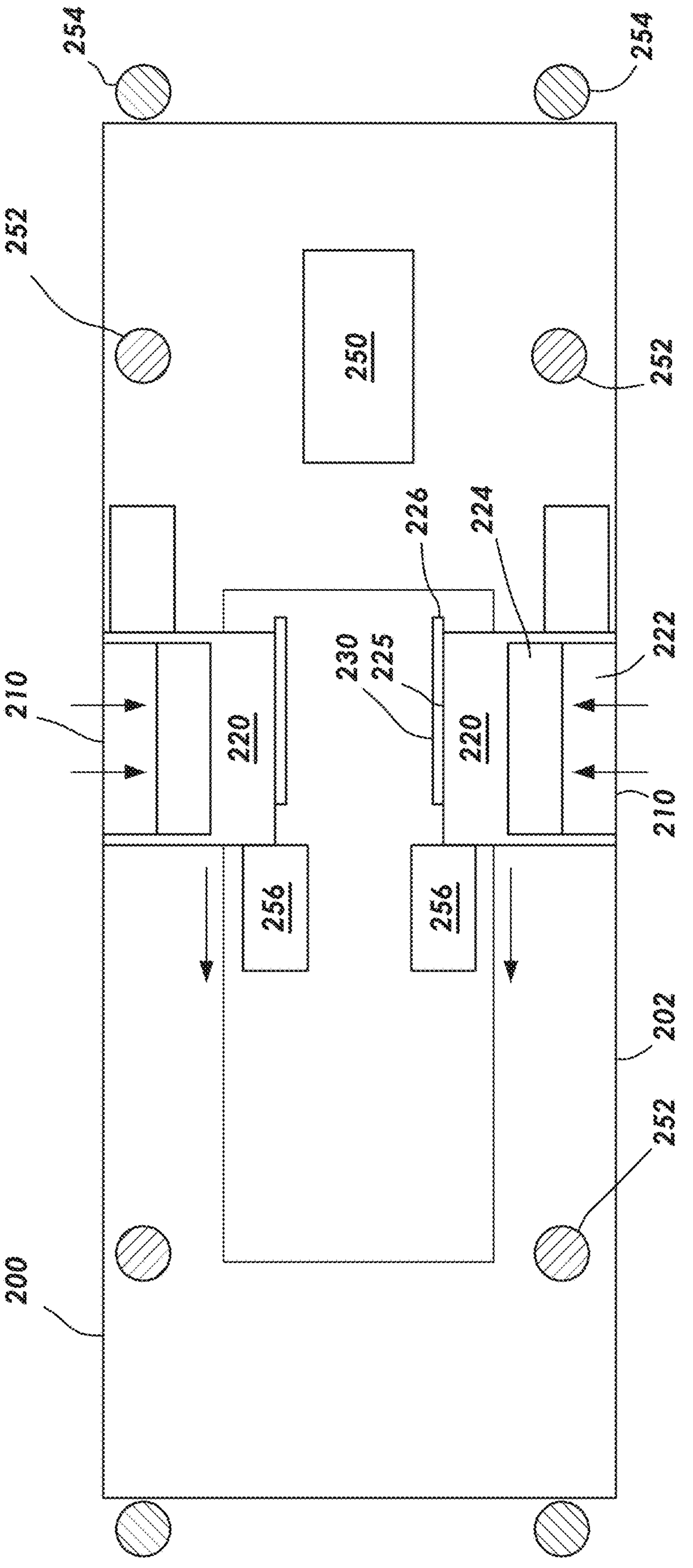
FIG. 1B is a block diagram of a generator within an enclosure with a damper in the open position, consistent with certain embodiments of the present disclosure.

FIGS. 1A and 1B are block diagrams of a generator within an enclosure consistent with certain embodiments of the present disclosure. FIGS. 1A and 1B include generator 100 positioned within enclosure 200. In certain embodiments, enclosure 200 may completely enclose generator 100. In other embodiments, enclosure 200 may only partially enclose generator 100. In the embodiment shown in FIGS. 1A and 1B, the generator may include one or more turbochargers 102. Enclosure 200 may include one or more air intakes 210, shown in particular in FIG. 6C. Air intakes 210 may be holes in the sides or top of enclosure 200 adapted to allow air to enter enclosure 200.

Figure 6A:
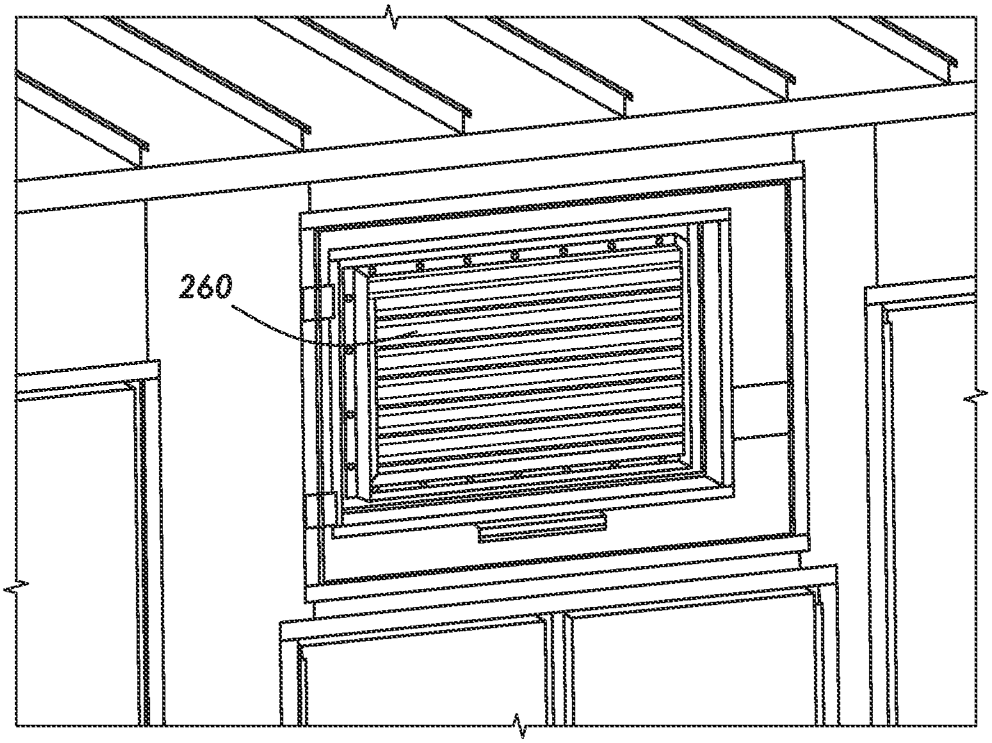
FIG. 6A is an exterior view of the enclosure having exterior louvers consistent with certain embodiments of the present disclosure.
Figure 6B:
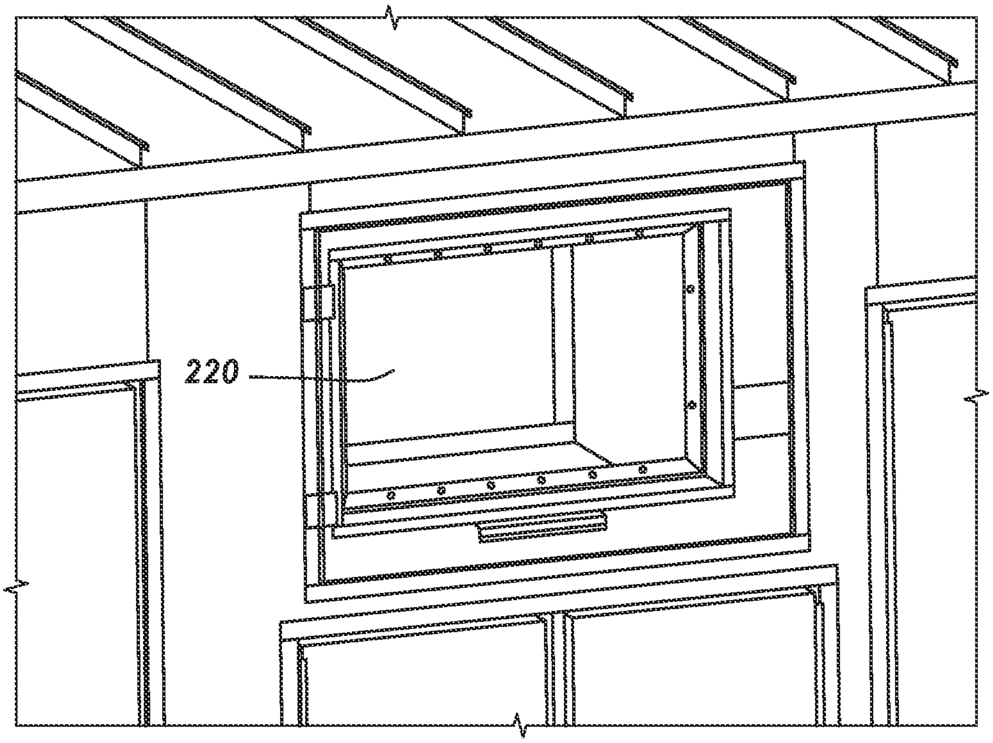
FIG. 6B is a cutaway exterior view of the enclosure showing an air intake enclosure consistent with certain embodiments of the present disclosure.
Figure 6C:
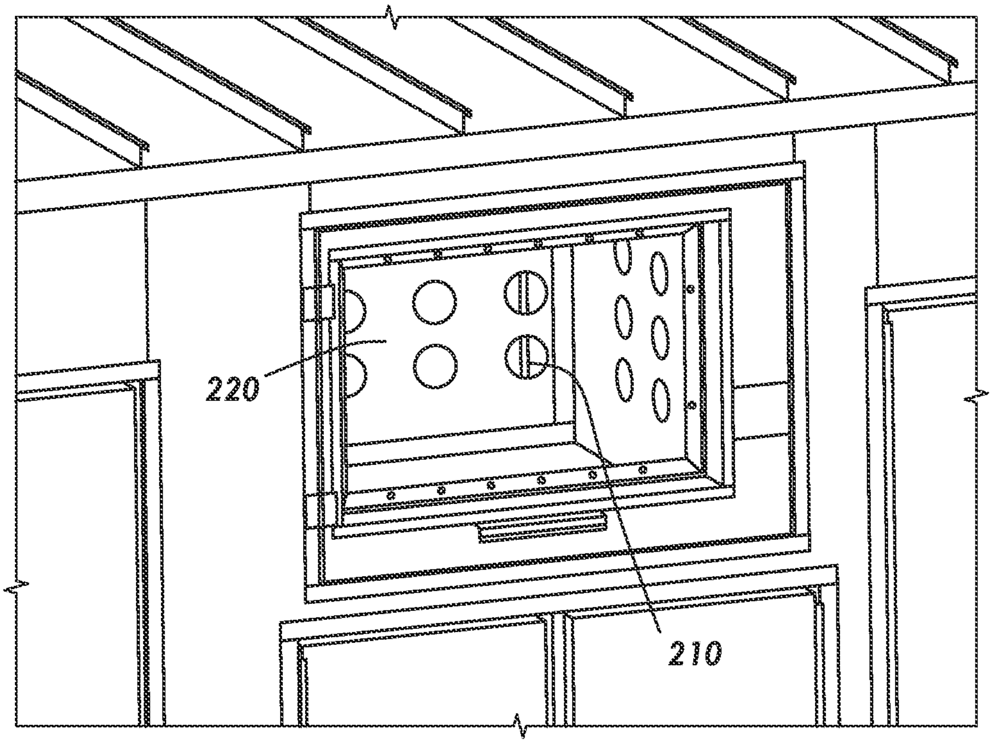
FIG. 6C is a cutaway exterior view of the enclosure showing an air intake enclosure consistent with certain embodiments of the present disclosure.

Air intake housing 220 may be positioned such that air entering enclosure 200 passes through air intake housing 220, as shown in FIGS. 6B and 6C. In certain embodiments, air intake housing 220 may be affixed to inside surface 202 of enclosure 200. In the non-limiting embodiment shown in FIGS. 1A and 1B, two air intake housings 220 are shown, although more or fewer air intake housings 220 are contemplated by this disclosure. Air intake housing 220 may be composed of any suitable material, including, but not limited to steel or aluminum. Air intake housing may include air outlet 228, as shown in FIGS. 2, 3, 4A, and 4B.

Figure 5A:
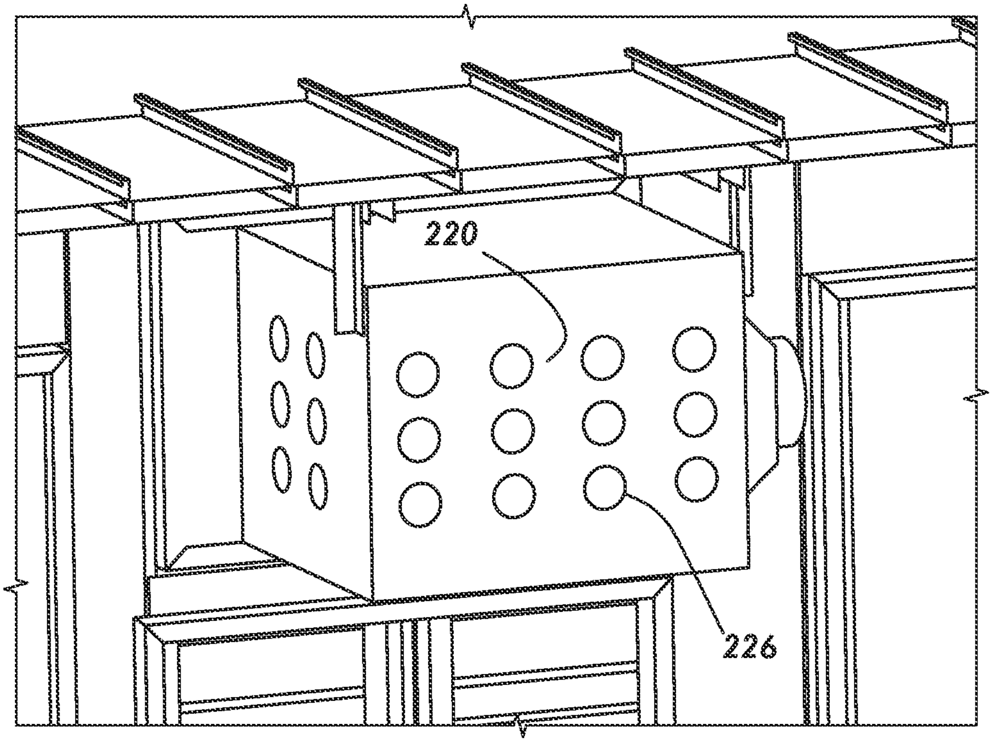
FIG. 5A is an interior side view of an embodiment of the present disclosure without a damper.
Figure 5B:
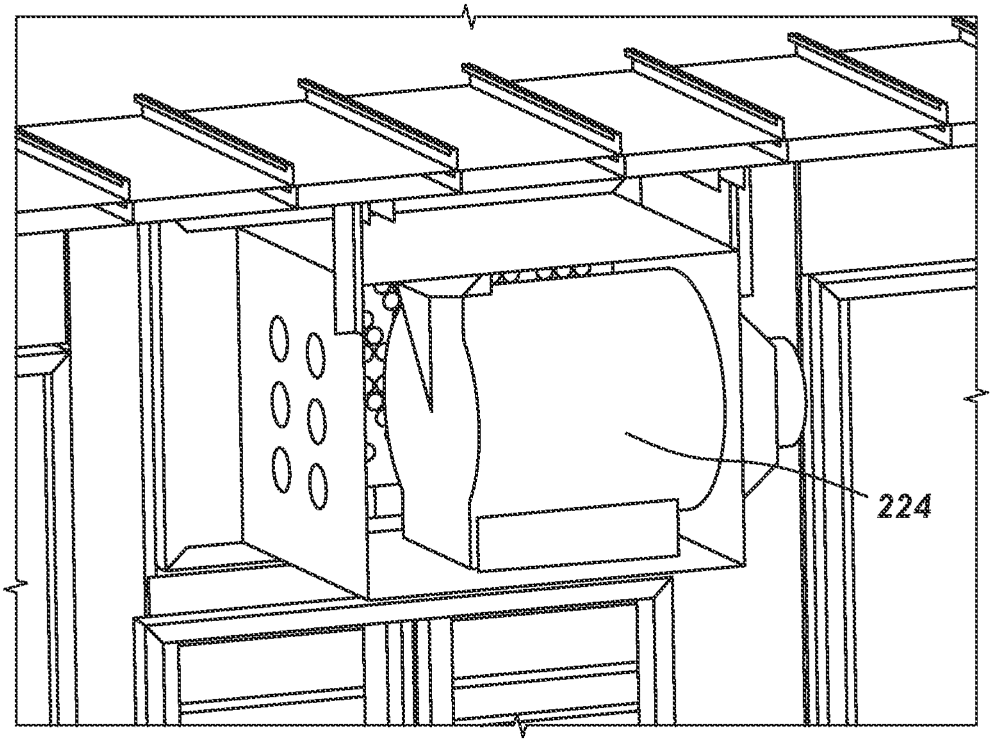
FIG. 5B is a cutaway side view of the air intake enclosure consistent with certain embodiments of the present disclosure.
Figure 5C:
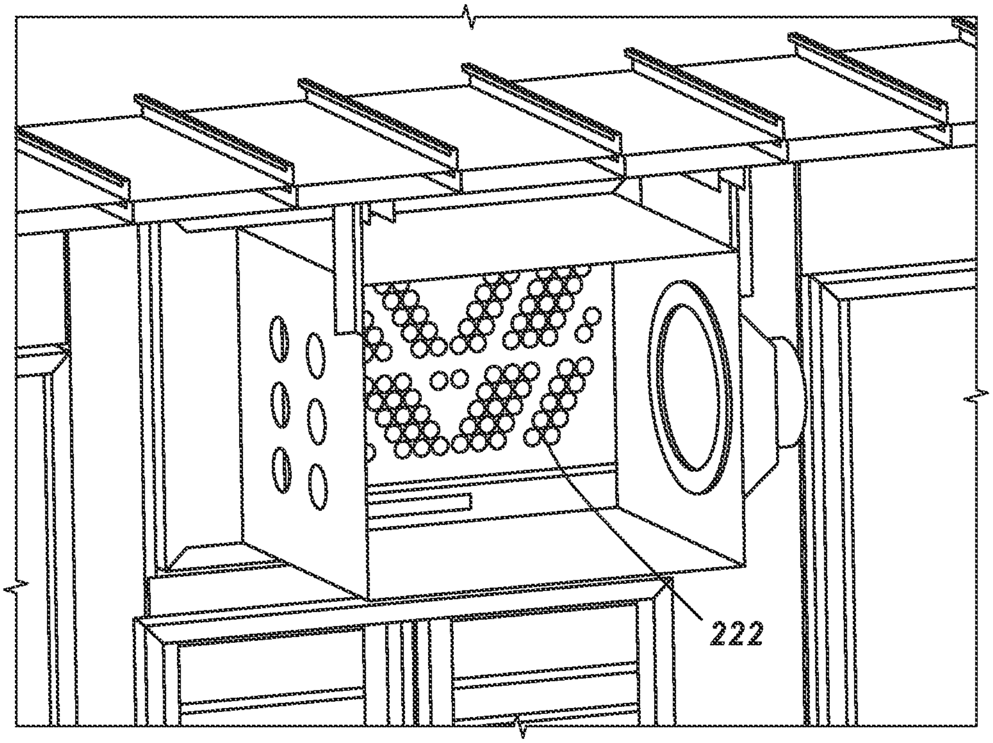
FIG. 5C is a cutaway side view of the air intake enclosure consistent with certain embodiments of the present disclosure.

One or more filters may be positioned within air intake housing 220. In the embodiments shown in FIGS. 1A and 1B, two filters are positioned within air intake housing 220—pre-cleaner 222, as shown in FIG. 5C, and filter element 224 As shown in FIG. 5C. Pre-cleaner 222 and filter element 224 are adapted to filter dust and other particulate matter from air.

Figure 3:
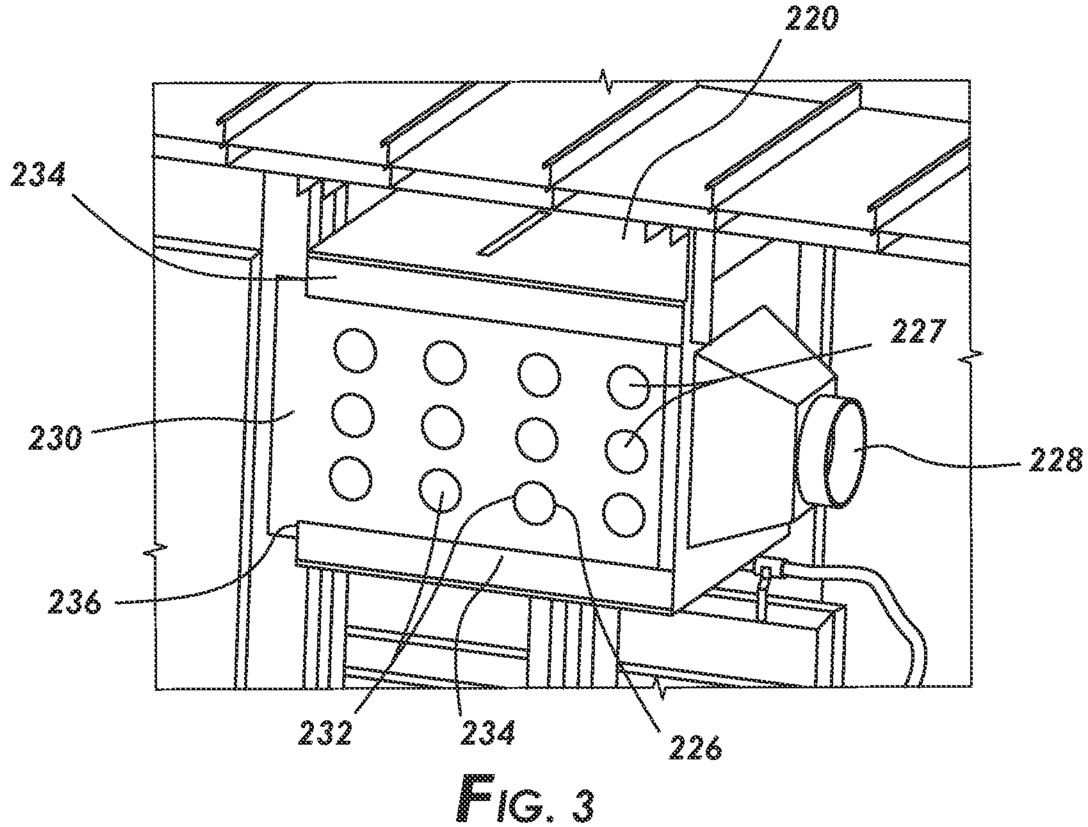
FIG. 3 is a side view of an air intake enclosure in a partially open position consistent with certain embodiments of the present disclosure.
Figure 4A:
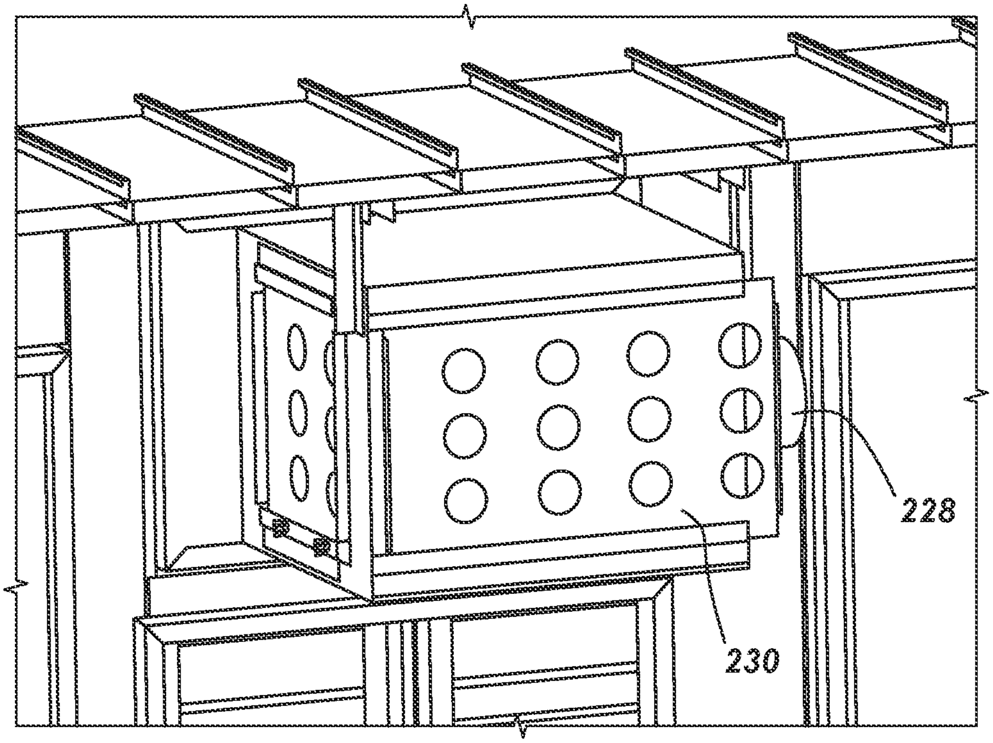
FIG. 4A is an interior side view of the air intake enclosure in the open position consistent with certain embodiments of the present disclosure.
Figure 4B:
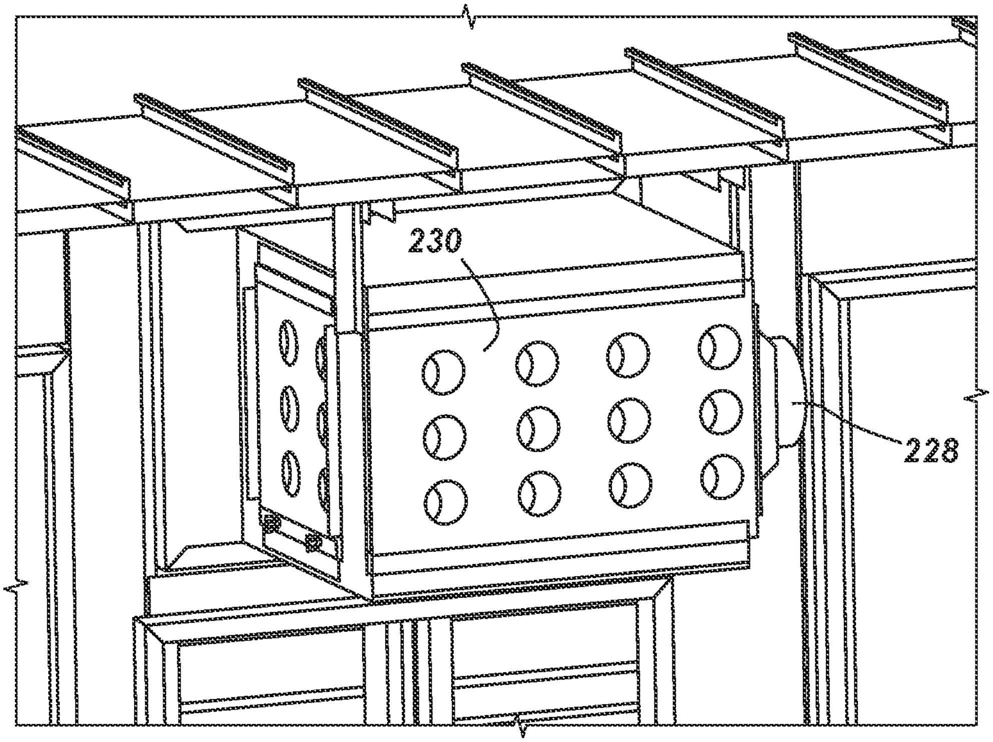
FIG. 4B is an interior side view of the air intake enclosure in the closed position consistent with certain embodiments of the present disclosure.

Air intake housing 220 may terminate within enclosure 200 in air intake housing inner plate 226 positioned at the inner edge 225 of air intake housing 220. In other embodiments, air intake housing inner plate may be omitted and inner edge 225 of air intake housing 220 may be open, as shown in FIG. 6B. As shown in FIG. 3, air intake housing inner plate 226 may include air intake holes 227. Air intake holes 227 may be drilled, punched, or formed on air intake housing inner plate 226.

Figure 2:
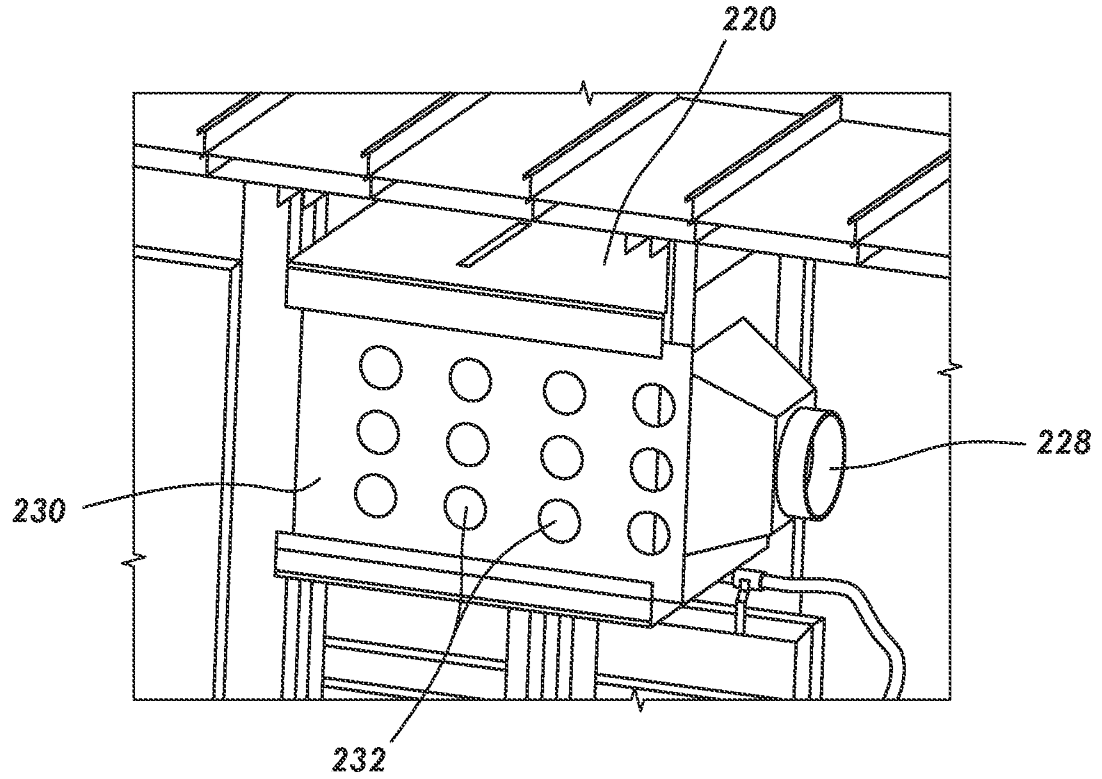
FIG. 2 is a side view of an air intake enclosure in the closed position consistent with certain embodiments of the present disclosure.

In certain embodiments, such as where air intake housing inner plate 226 is present, damper 230 may be positioned so as to abut air intake housing inner plate 226. In some embodiments, damper 230 is a plate. In some embodiments, damper 230 is a plate with damper holes 232. Damper 230 may be adapted to slide parallel to air intake housing inner plate 226 from the closed position as shown in FIGS. 1B and 2 to a partially open position as shown in FIGS. 1B and 3 to a fully open position. In certain embodiments, as damper 230 is slid from the closed position to the open position, more of air intake holes 227 are aligned with damper holes 232, allowing a lesser volume of air to enter enclosure 200 through air intakes 210. Damper 230 may be held within rails 234. As damper 230 is slid from the closed position to an open position, or vice versa, damper 230 slides along rails 234. Thus, when damper 230 is in a closed position, all air fed to generator 100 is air from outside the enclosure, which, while the generator is operating, is generally at a lower temperature than air from inside enclosure 200. As damper 230 is slid from the closed position to an open position, more inside air is combined with air from outside enclosure 200, thereby providing generator 100 with a warmer air feed than if the air feed to generator 100 was entirely air from outside enclosure 200. Thus, an operator may control the temperature of the air feed to generator 100 by changing the position of damper 230 by aligning more or fewer air intake holes 227 and damper holes 232. In other embodiments, as shown in FIG. 5A, the damper is omitted.

In some embodiments, damper 230 may be slid manually. In other embodiments, damper 230 may be moved with a mechanical electric actuator. The mechanical actuator may be driven by damper motor 256. When slid manually, damper 230 may be held by mounting nuts 236. To slide damper 230, a user may loosen mounting nuts 236, slide damper 230 along rails 234 to a desired position, and then retighten mounting nuts 236.

Figure 7:
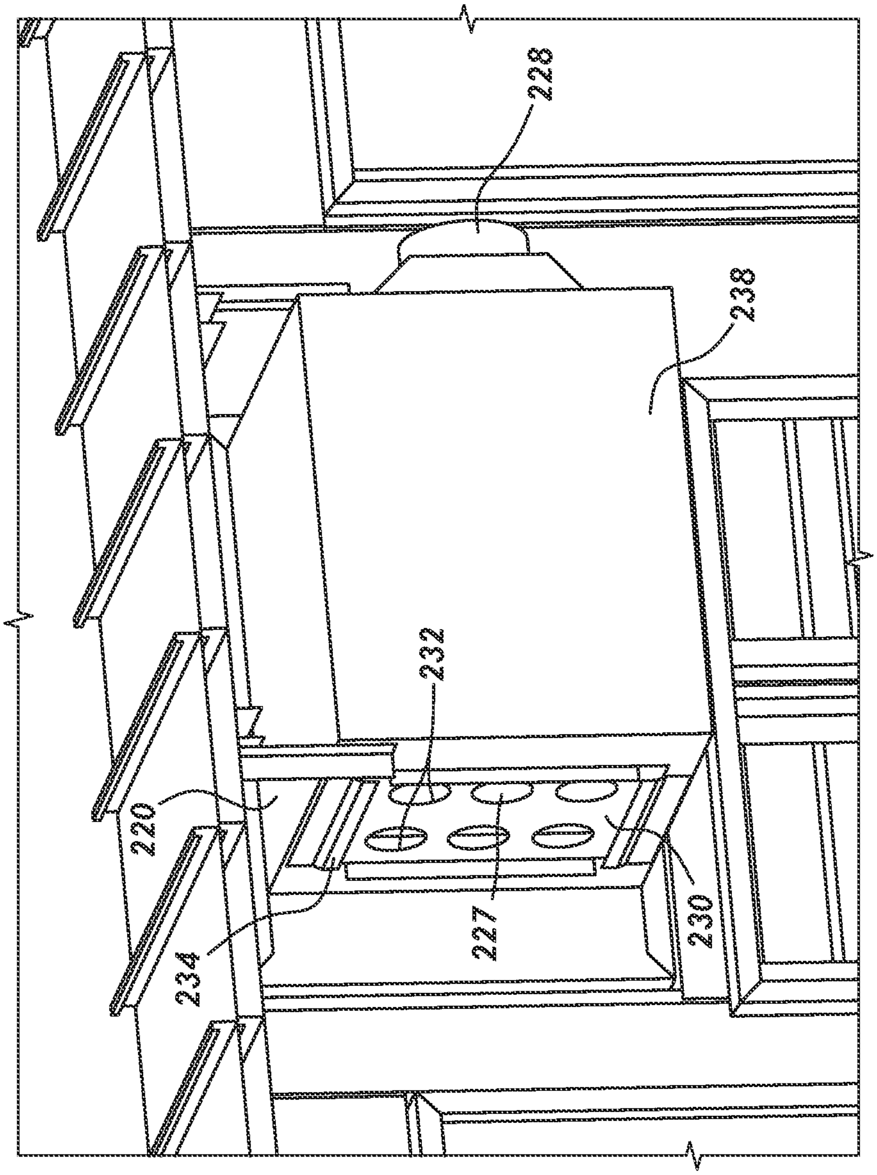
FIG. 7 is a side view of an air intake enclosure in a partially open position consistent with certain embodiments of the present disclosure.
Figure 8:
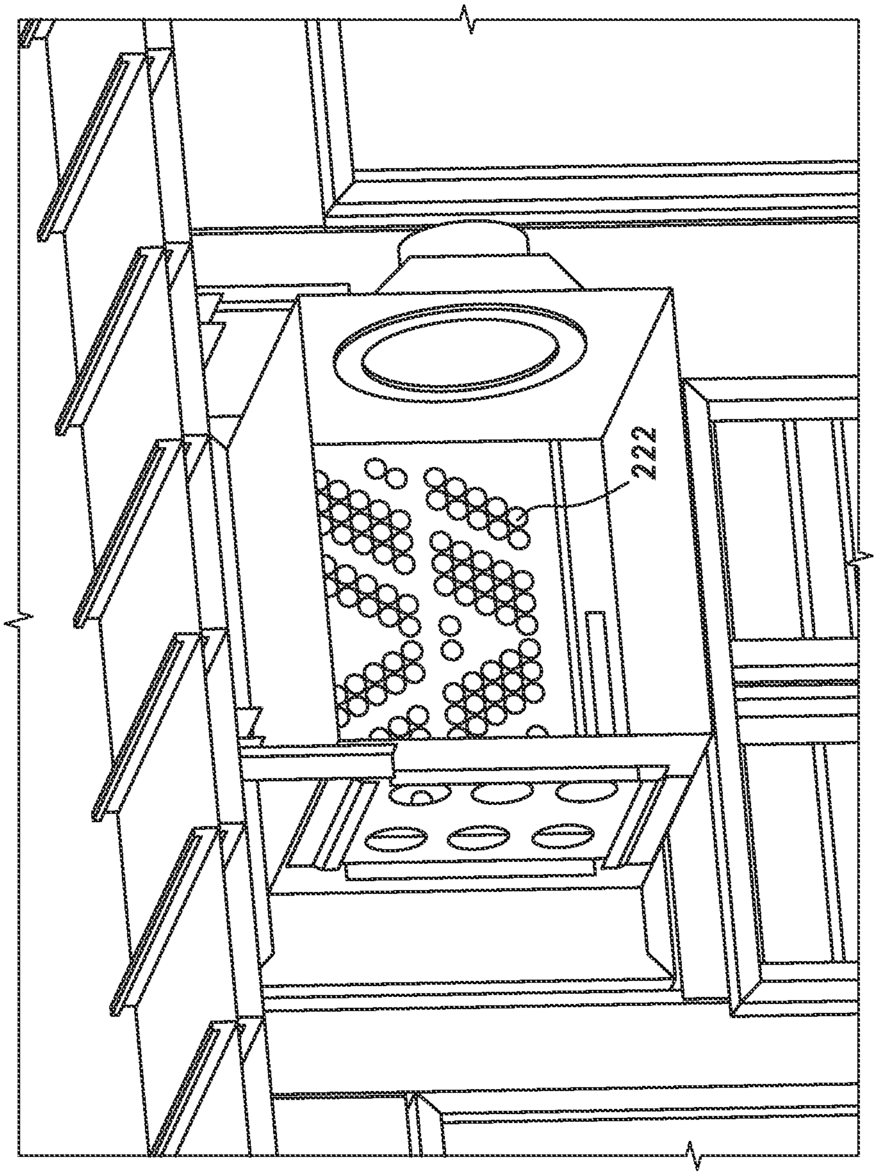
FIG. 8 is a cutaway side view of the air intake enclosure consistent with certain embodiments of the present disclosure.
Figure 9:
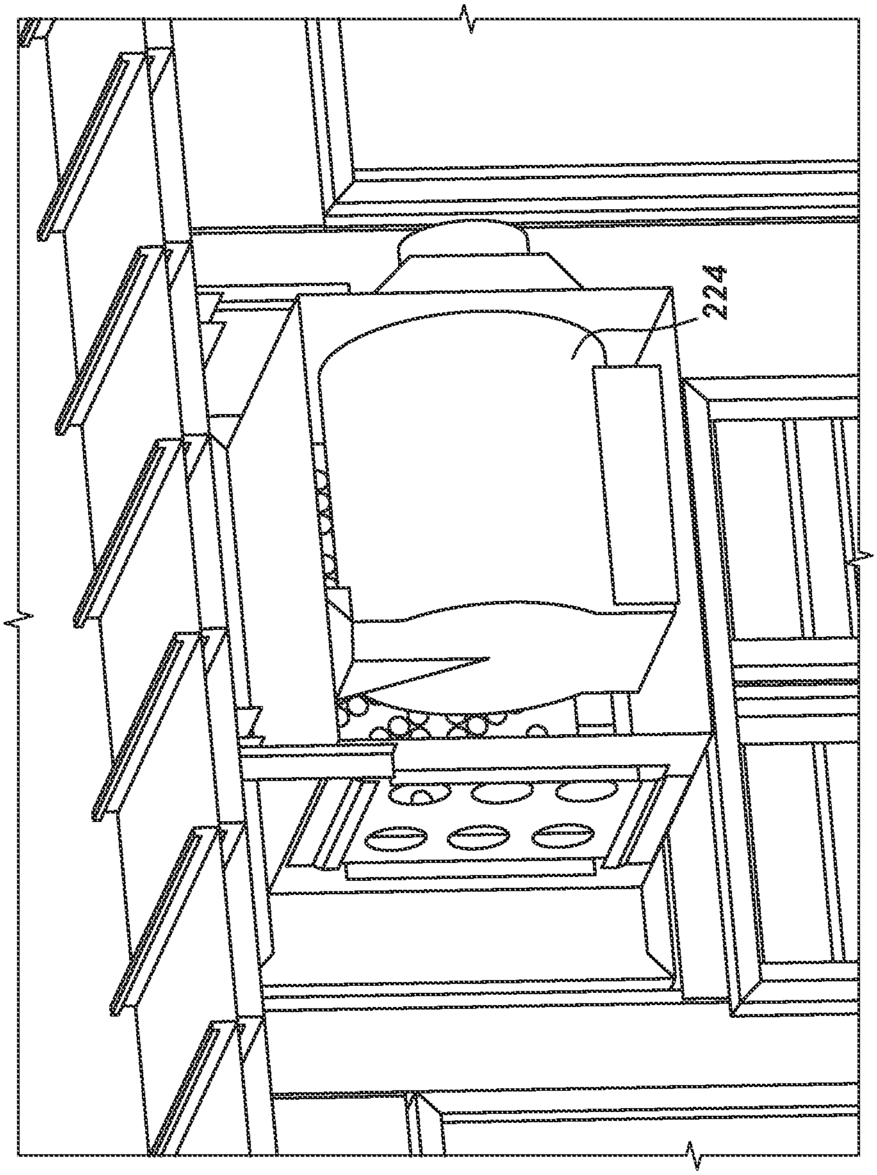
FIG. 9 is a cutaway side view of the air intake enclosure consistent with certain embodiments of the present disclosure.

In yet other embodiments, as shown in FIGS. 7, 8, and 9, side plate 238 has no holes. Damper 230 is positioned perpendicular to side plate 238. These embodiments may allow control of air entering generator 100, flexibility in damper 230 position, and assistance in sound attenuation.

In certain embodiments exterior louvers 260 may be positioned within air intake housing 220 or the exterior of air intake 210, opposite damper 230. Exterior louvers 260, as shown in FIG. 6A, are in the closed position, preventing or retarding air from outside enclosure 200 from entering air intake 210. When in the open position, exterior louvers 260 allow air from outside enclosure 200 to enter air intake 210. In certain embodiments, exterior louvers 260 may be manually operated. In other embodiments, exterior louvers 260 may be operated by a mechanical electric actuator, as described further below. In some embodiments, exterior louvers 260 may be locked in the open or closed position, such as with a locking lever.

By operating both damper 230 and exterior louvers 260 in different positions, air to turbocharger 102 may be changed from entirely outside air, entirely inside air, and partially outside/partially inside air. For example, if exterior louvers 260 are closed, all air to turbocharger 102 is inside air. When exterior louvers are open, by altering the position of damper 230, the air to turbocharger 102 may be entirely outside air or partially outside/partially inside air.

In certain embodiments, air intake control system 250 may be used in conjunction with dampers 230 to control air feed temperature of generator 100. In such embodiments, air intake control system 250 may be electrically connected to one or more interior temperature sensors 252, positioned within enclosure 200 and one or more exterior temperature sensors 254. Air intake control system 250 may also be electrically connected to the mechanical electric actuator. Based on a desired temperature of the air feed to generator 100 and the outside air temperature measured by exterior temperature sensors 254 and interior temperature sensors 252, air intake control system 250 may activate damper motors 256, mechanically connected to the mechanical electric actuator to move dampers 230 to the desired partially open, open, or closed position to achieve the desired temperature of the air feed to generator 100. In certain embodiments, temperature of the air feed to generator 100 may be measured by generator air feed temperature sensor 258. In certain embodiments, exterior temperature sensors 254 and interior temperature sensors 252 may be omitted and the temperature of the air feed to generator 100 may be controlled only through generator air feed temperature sensor 258 and a feedback control system.

In certain embodiments, air intake control system 250 may be electrically connected to an electrical mechanical actuator for opening and closing exterior louvers 260. By opening and closing exterior louvers 260 in conjunction with damper 230 air to turbocharger 102 may be changed from entirely outside air, entirely inside air, and partially outside/partially inside air, as described above.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A system comprising:

a generator;

an enclosure surrounding the generator, the generator having an air intake, an inside surface, and an outside surface;

an air intake housing affixed to the inside surface of the enclosure and fluidly connected to the air intake, the air intake housing terminating in an air intake housing inner plate positioned at an inner edge of the air intake housing, the air intake housing inner plate having a plurality of air intake holes; and a damper, the damper abutting the air intake housing inner plate, the damper having a plurality of damper holes, the damper adapted to slide along the air intake housing inner plate.

2. The system of claim 1, wherein the enclosure completely encloses the generator.

3. The system of claim 1, wherein the air intakes comprises holes in the sides or top of the enclosure.

4. The system of claim 1, wherein the air intake housing is composed of steel or aluminum.

5. The system of claim 1, wherein a filter is positioned within the air intake housing.

6. The system of claim 1, wherein the air intake holes are drilled, punched or formed.

7. The system of claim 1, wherein the damper is a plate.

8. The system of claim 1, wherein when the damper slides along the air intake housing inner plate at least some of the air intake holes and damper holes align.

9. The system of claim 1, wherein the damper is held by rails.

10. The system of claim 1 further comprising exterior louvers, the exterior louvers positioned opposite the damper within the air intake housing.

11. The system of claim 10, wherein the exterior louvers may be locked in an open position or in a closed position.

12. The system of claim 1 further comprising:

an air intake control system;

an interior temperature sensor positioned within the enclosure and electrically connected to the air intake control system; and an exterior temperature sensor positioned outside the enclosure and electrically connected to the air intake control system.

13. The system of claim 12, wherein the system further comprises a generator air feed temperature sensor positioned adjacent the generator.

14. The system of claim 12 further comprising exterior louvers, the exterior louvers positioned opposite the damper within the air intake housing.

15. A method comprising:

supplying an air intake control system;

electrically connecting an exterior temperature sensor to the air intake control system, the exterior temperature sensor positioned outside an enclosure, wherein a generator is positioned within the enclosure;

electrically connecting an interior temperature sensor to the air intake control system, the interior temperature sensor positioned within the enclosure;

electrically connecting a mechanical electric actuator to the air intake control system; and mechanically connecting the mechanical electric actuator to a damper, the damper having damper holes, the damper abutting an air intake housing inner plate, the air intake housing inner plate having air intake holes.

16. The method of claim 15 further comprising:

detecting an outside temperature using the exterior temperature sensors;

detecting an inside temperature using the interior temperature sensors;

determining a desired generator air feed temperature;

sliding the damper to align the damper holes with the air intake holes until the desired generator air feed temperature is achieved.

17. The method of claim 16, wherein the generator air feed temperature is measured by a generator air feed temperature sensor.

18. The method of claim 16, wherein the damper is aligned using the mechanical electric actuator.

19. The method of claim 16, wherein the damper is aligned to a closed position, an open position, or a partially open position.

20. The method of claim 15, further comprising:

supplying exterior louvers, the exterior louvers positioned opposite the damper within the air intake housing;

detecting an outside temperature using the exterior temperature sensors;

detecting an inside temperature using the interior temperature sensors;

determining a desired generator air feed temperature;

opening or closing the exterior louvers to achieve the desired generator air feed temperature.

* * * * *